(12) United States Patent
Kim et al.

(10) Patent No.: US 9,088,790 B2
(45) Date of Patent: Jul. 21, 2015

(54) DISPLAY DEVICE AND METHOD OF CONTROLLING THE SAME

(71) Applicant: SAMSUNG ELECTRONICS CO., LTD., Suwon-si (KR)

(72) Inventors: Sung-yeol Kim, Suwon-si (KR); In-hak Na, Anyang-si (KR); Jin-sung Lee, Suwon-si (KR); Ho-young Lee, Suwon-si (KR)

(73) Assignee: SAMSUNG ELECTRONICS CO., LTD., Suwon Si (KR)

( * ) Notice: Subject to any disclaimer, the term of this patent is extended or adjusted under 35 U.S.C. 154(b) by 0 days.

(21) Appl. No.: 14/171,861

(22) Filed: Feb. 4, 2014

(65) Prior Publication Data

US 2015/0077526 A1  Mar. 19, 2015

(30) Foreign Application Priority Data

Sep. 16, 2013  (KR) .......................... 10-2013-0111058

(51) Int. Cl.
*H04N 13/04*  (2006.01)

(52) U.S. Cl.
CPC ....... *H04N 13/0402* (2013.01); *H04N 13/0445* (2013.01); *H04N 13/0447* (2013.01); *H04N 13/0454* (2013.01)

(58) Field of Classification Search
CPC .......... H04N 13/0044; H04N 13/0011; H04N 13/0014; H04N 13/0037; H04N 13/0454
USPC ..................................... 348/50–60
See application file for complete search history.

(56) References Cited

U.S. PATENT DOCUMENTS

| | | | | |
|---|---|---|---|---|
| 7,245,430 | B2 * | 7/2007 | Kobayashi et al. | 359/464 |
| 8,314,833 | B2 * | 11/2012 | Kim et al. | 348/51 |
| 8,456,516 | B2 * | 6/2013 | Kimpe | 348/42 |
| 8,493,440 | B2 * | 7/2013 | Krijn et al. | 348/59 |
| 8,570,363 | B2 * | 10/2013 | Ramstad | 348/51 |
| 8,687,051 | B2 * | 4/2014 | de La Barre et al. | 348/51 |
| 2003/0156822 | A1 * | 8/2003 | Um et al. | 386/52 |
| 2009/0040297 | A1 * | 2/2009 | Harada et al. | 348/54 |

(Continued)

FOREIGN PATENT DOCUMENTS

| EP | 2 624 572 A2 | 8/2013 |
|---|---|---|
| EP | 2 797 328 A1 | 10/2014 |

(Continued)

OTHER PUBLICATIONS

International Search Report for PCT/KR2014/001192 dated Jun. 16, 2014 [PCT/ISA/210].

(Continued)

*Primary Examiner* — Sath V Perungavoor
*Assistant Examiner* — Matthew J Anderson
(74) *Attorney, Agent, or Firm* — Sughrue Mion, PLLC

(57) ABSTRACT

A multi-viewpoint image display device is provided. The display device includes a tracker configured to track a position of a face of a user according to a user shifting position, a display configured to provide a multi-view and to select and provide first and second target views of the multi-view as user's left-eye and right-eye images, and a controller configured to shift positions of the multi-view and to provide the shifted multi-view so that the first and second target views are provided as the user's left-eye and right-eye images based on the tracked face position of the face of the user.

20 Claims, 15 Drawing Sheets

(56) References Cited

U.S. PATENT DOCUMENTS

| | | |
|---|---|---|
| 2009/0115800 A1* | 5/2009 | Berretty et al. ............... 345/690 |
| 2009/0141121 A1* | 6/2009 | Kimpe ............................ 348/51 |
| 2009/0282429 A1 | 11/2009 | Olsson et al. |
| 2010/0027113 A1* | 2/2010 | Shin et al. ..................... 359/463 |
| 2010/0060667 A1* | 3/2010 | Chen et al. .................... 345/690 |
| 2010/0165221 A1* | 7/2010 | Krijn et al. ..................... 349/15 |
| 2010/0295930 A1* | 11/2010 | Ezhov ............................. 348/58 |
| 2011/0090243 A1 | 4/2011 | Park et al. |
| 2011/0157171 A1* | 6/2011 | Lin ................................. 345/419 |
| 2011/0157322 A1* | 6/2011 | Bennett et al. ................. 348/51 |
| 2011/0181693 A1* | 7/2011 | Lee et al. ........................ 348/43 |
| 2011/0199463 A1* | 8/2011 | Gallagher et al. ............. 348/53 |
| 2011/0199469 A1* | 8/2011 | Gallagher ....................... 348/60 |
| 2011/0255159 A1* | 10/2011 | Michael Krijn et al. ...... 359/463 |
| 2011/0310232 A1* | 12/2011 | Wilson et al. .................. 348/51 |
| 2012/0019516 A1 | 1/2012 | Park et al. |
| 2012/0044333 A1* | 2/2012 | Kang .............................. 348/56 |
| 2012/0154526 A1* | 6/2012 | Ji et al. ........................... 348/43 |
| 2012/0170833 A1* | 7/2012 | Kokojima et al. ............ 382/154 |
| 2012/0274749 A1 | 11/2012 | Nakayama et al. |
| 2013/0010063 A1* | 1/2013 | Redmann ........................ 348/43 |
| 2013/0033585 A1* | 2/2013 | Li et al. .......................... 348/51 |
| 2013/0050303 A1 | 2/2013 | Mishima et al. |
| 2013/0050412 A1 | 2/2013 | Shinohara et al. |
| 2013/0076735 A1 | 3/2013 | Lee |
| 2013/0076738 A1 | 3/2013 | Jian et al. |
| 2013/0106844 A1 | 5/2013 | Hong et al. |
| 2013/0107005 A1 | 5/2013 | Lim et al. |
| 2013/0147797 A1* | 6/2013 | Tanaka ........................... 345/419 |
| 2013/0162634 A1* | 6/2013 | Baik ............................... 345/419 |
| 2013/0169603 A1* | 7/2013 | Bae et al. ....................... 345/204 |
| 2013/0169623 A1* | 7/2013 | Han ................................ 345/419 |
| 2013/0194395 A1* | 8/2013 | Hannuksela et al. ........... 348/51 |
| 2013/0222534 A1* | 8/2013 | Rusanovskyy et al. ........ 348/43 |
| 2013/0278736 A1 | 10/2013 | Saito |
| 2013/0286170 A1* | 10/2013 | Qin et al. ........................ 348/59 |
| 2013/0287313 A1* | 10/2013 | Marchessoux et al. ....... 382/274 |
| 2014/0015941 A1* | 1/2014 | Park et al. ...................... 348/56 |
| 2014/0022340 A1* | 1/2014 | Dane et al. ..................... 348/42 |
| 2014/0029093 A1* | 1/2014 | Lee et al. ....................... 359/462 |
| 2014/0050458 A1* | 2/2014 | Mochinaga et al. .......... 386/239 |
| 2014/0085433 A1* | 3/2014 | Han et al. ....................... 348/51 |
| 2014/0111627 A1* | 4/2014 | Ishigami ........................ 348/51 |
| 2015/0029317 A1 | 1/2015 | Kim et al. |

FOREIGN PATENT DOCUMENTS

| | | |
|---|---|---|
| JP | 2011-526090 A | 9/2011 |
| JP | 2013-46263 A | 3/2013 |
| KR | 10-2011-0045654 | 5/2011 |
| KR | 10-2013-0009115 A | 1/2013 |
| KR | 10-2013-0048299 A | 5/2013 |
| KR | 10-2013-0048564 A | 5/2013 |
| KR | 10-2013-0073799 A | 7/2013 |
| WO | 2011/086593 A1 | 7/2011 |
| WO | 2012/165133 A1 | 12/2012 |
| WO | 2013/040683 A1 | 3/2013 |
| WO | 2013/102500 A1 | 7/2013 |

OTHER PUBLICATIONS

Written Opinion for PCT/KR2014/001192 dated Jun. 16, 2014 [PCT/ISA/237].

Communication dated Dec. 19, 2014 issued by the European Patent Office in counterpart European Patent Application No. 14156330.4.

* cited by examiner

DISPLAY DEVICE AND METHOD OF CONTROLLING THE SAME

PRIORITY

This application claims priority from Korean Patent Application No. 10-2013-0111058, filed on Sep. 16, 2013, in the Korean Intellectual Property Office, the disclosure of which is incorporated herein by reference, in its entirety.

BACKGROUND

1. Technical Field

The exemplary embodiments generally relate to a multi-viewpoint image display device and a method of controlling the same. More particularly, the exemplary embodiments relate to a non-glasses type multi-viewpoint image display device and a method of controlling the same.

2. Description of the Related Art

With the development of electronic technology, various types of electronic devices have been developed and become wide spread. Particularly, in recent several years, display devices, such as TVs, which are home appliances mainly used in homes, have developed rapidly.

As the performances of display devices have been advanced, the kinds of content that are displayed on the display devices have also increased. In particular, stereoscopic 3D display systems which can display 3D content have recently been developed and become wide spread.

3D display devices may be implemented by not only, by 3D TVs used in homes but also diverse types of display devices, such as monitors, mobile phones, PDAs, set-top PCs, tablet PCs, digital photo frames, and kiosks. Further, 3D display technology may be used not only for home use but also in diverse fields that require 3D imaging, such as science, medicine, design, education, advertisement and computer games.

The 3D display system is briefly classified into a non-glasses type system that is viewable without glasses and a glasses type system that is viewable through the wearing of glasses.

The glasses type system can provide a satisfactory 3D effect, but a viewer wearing glasses may cause inconvenience. In contrast, the non-glasses type system has the advantage that a viewer can view a 3D image without glasses, and development of such a non-glasses type system has been continuously discussed.

However, the non-glasses type system has the problem that due to the difference in arrangement between the pixel columns and the lenticular, light emitted from other pixels overlapping each other, crosstalk occurs between the images. "Crosstalk" means a phenomenon that the (N+1)-th or (N−1)-th image is partially mixed and shown through the user's right or left eye in addition to the N-th image. In this case, the same object is shown in other views, and when crosstalk occurs, several contours of the object appear blurred. Accordingly, if the crosstalk is increased, the picture quality becomes deteriorated.

SUMMARY

The exemplary embodiments have been made to address at least the above problems and/or disadvantages and to provide at least the advantages described below. Accordingly, an aspect of the exemplary embodiments provide a multi-viewpoint image display device and a method for controlling the same, which can provide a 3D effect while minimizing the occurrence of crosstalk.

According to one aspect of the exemplary embodiments, a multi-viewpoint image display device includes a display configured to provide a multi-view; a tracker configured to track a position of a face of a user according a user shifting position; and a controller configured to shift positions of the multi-view and to provide the shifted multi-view so that first and second target views of the multi-view are provided as user's left-eye and right-eye images, based on the tracked face position of the user.

The display may include a display panel on which a plurality of images having different viewpoints are repeated in order to be sequentially arranged; and a visual field separator arranged in front of the display panel to provide the multi-view which corresponds to the different viewpoints by viewing areas.

The controller may be configured to provide the first target view in replacement of the remaining views that are positioned in the same direction as the first target view of the multi-view, and may provide the second target view in replacement of the remaining views that are positioned in the same direction as the second target view of the multi-view.

The controller may be configured to provide a first sub-view of sub-views that constitute the multi-view in replacement of all the sub-views that constitute the first target view and the remaining target views positioned in the same direction as the first target view, and may provide a second sub-view of the sub-views in replacement of all the sub-views that constitute the second target view and the remaining target views positioned in the same direction as the second target view.

The controller may be configured to adjust luminance of a predetermined number of sub-views that are adjacent to the first and second target views among a plurality of sub-views that constitute the multi-view below a predetermined luminance value, and may provide the luminance-adjusted sub-views.

The controller may be configured to adjust the luminance of the predetermined number of sub-views that are adjacent to the first and second target views to luminance values to which weight values according to distances that are measured with respect to the first and second target views are applied, and may provide the luminance-adjusted sub-views.

The controller may be configured to adjust luminance of the remaining views except for the first and second target views that are selected from the multi-view to luminance values to which weight values according to distances that are measured with respect to the first and second target views in the same directions as the first and second target views are applied, and may provide the luminance-adjusted remaining views.

The controller may be configured to adjust the luminance of the remaining views so that the luminance is decreased in reverse proportion to distances between the remaining views positioned in the same direction as the first target view and the first target view, and may adjust the luminance of the remaining views so that the luminance is decreased in reverse proportion to distances between the remaining views positioned in the same direction as the second target view and the second target view.

According to another aspect of the exemplary embodiments, a method for controlling a multi-viewpoint image display device includes providing first and second target views of a multi-view as user's left-eye and right-eye images; tracking a position of a face of a user according to the user shifting position; and shifting positions of the multi-view and providing the shifted multi-view so that the first and second target views are provided as the left-eye and right-eye images, based on the tracked position of the face of a user.

The multi-viewpoint image display device may include a display panel on which a plurality of images having different viewpoints are repeated in order to be sequentially arranged; and a visual field separator arranged in front of the display panel to provide the multi-view which corresponds to the different viewpoints by viewing areas.

The providing of the first and second target views as the user's left-eye and right-eye images may provide the first target view in replacement of the remaining views that are positioned in the same direction as the first target view of the multi-view, and may provide the second target view in replacement of the remaining views that are positioned in the same direction as the second target view of the multi-view.

The providing of the first and second target views as the user's left-eye and right-eye images may provide a first sub-view of sub-views that constitute the multi-view in replacement of all the sub-views that constitute the first target view and the remaining target views positioned in the same direction as the first target view, and may provide a second sub-view of the sub-views in replacement of all the sub-views that constitute the second target view and the remaining target views positioned in the same direction as the second target view.

The providing of the first and second target views as the user's left-eye and right-eye images may adjust the luminance of a predetermined number of sub-views that are adjacent to the first and second target views among a plurality of sub-views that constitute the multi-view below a predetermined luminance value, and may provide the luminance-adjusted sub-views.

The providing of the first and second target views as the user's left-eye and right-eye images may adjust the luminance of the predetermined number of sub-views that are adjacent to the first and second target views to luminance values to which weight values according to distances that are measured with respect to the first and second target views are applied, and may provide the luminance-adjusted sub-views.

The providing of the first and second target views as the user's left-eye and right-eye images may adjust the luminance of the remaining views except for the first and second target views that are selected from the multi-view to luminance values to which weight values according to distances that are measured with respect to the first and second target views in the same directions, as the first and second target views are applied, and may provide the luminance-adjusted remaining views.

The providing of the first and second target views as the user's left-eye and right-eye images may adjust the luminance of the remaining views so that the luminance is decreased in reverse proportion to distances between the remaining views positioned in the same direction as the first target view and the first target view, and may adjust the luminance of the remaining views so that the luminance is decreased in reverse proportion to distances between the remaining views positioned in the same direction as the second target view and the second target view.

An aspect of an exemplary embodiment may provide a multi-viewpoint image display device for providing a 3D effect while reducing crosstalk, the display device including: a tracker configured to track a position of a face of a user according to a user shifting position; and a controller configured to shift positions of a multi-view and provide a shifted multi-view image so that first and second target views of the multi-view are provided as a user's left-eye and right-eye images, based on the tracked position of the user's face; wherein a 3D effect is obtained even when the user changes position.

The image display device further includes a display including a display panel and a visual field separator, the display configured to provide the multi-view image.

The display panel may provide a plurality of images having different viewpoints which are repeated to be sequentially arranged; and the visual field separator may be arranged in front of the display panel to provide the multi-view which corresponds to the different viewpoints, by viewing areas.

The controller may be configured to adjust luminance of a predetermined number of sub-views that are adjacent to the first and second target views from among a plurality of sub-views that constitute the multi-view below a predetermined luminance value, and provide the luminance-adjusted sub-views.

The controller may be configured to provide the first target view in replacement of remaining views that are positioned in the same direction as the first target view of the multi-view, and provides the second target view in replacement of the remaining views that are positioned in the same direction as the second target view of the multi-view.

The controller may also be configured to adjust the luminance of the remaining views so that the luminance is decreased in reverse proportion to distances between the remaining views positioned in the same direction as the first target view and the first target view, and adjusts the luminance of the remaining views so that the luminance is decreased in reverse proportion to distances between the remaining views positioned in the same direction as the second target view and the second target view.

According to the various embodiments of the exemplary embodiments as described above, a non-glasses type 3D system that minimizes the occurrence of crosstalk can be provided.

BRIEF DESCRIPTION OF THE DRAWINGS

The above and other aspects, features and advantages of the exemplary embodiments will be more apparent from the following detailed description when taken in conjunction with the accompanying drawings, in which.

DETAILED DESCRIPTION OF THE EXEMPLARY EMBODIMENTS

Hereinafter, various exemplary embodiments will be described in detail with reference to the accompanying drawings.

Figure 1:
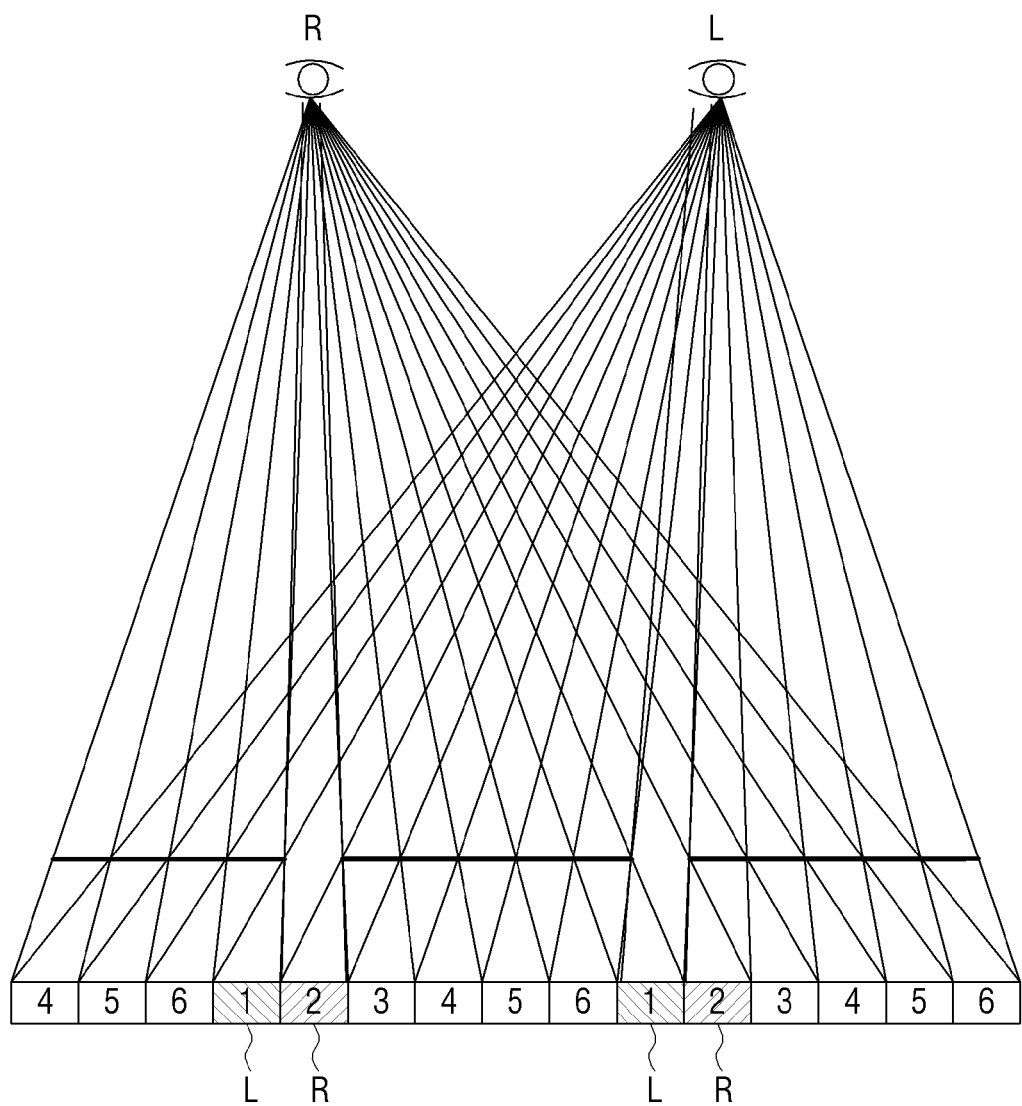
FIG. 1 is a view which explains the operation of a display device according to an exemplary embodiment.

FIG. 1 is a view which explains the operation of a display device according to an exemplary embodiment.

FIG. 1 shows a type of operation of a device that provides a 3D image in a non-glasses manner through displaying of a multi-viewpoint image according to an exemplary embodiment The multi-viewpoint image includes a plurality of images that are obtained by capturing images of the same object at different viewpoints. That is, the multi-viewpoint image provides images that are obtained by refracting a plurality of images captured at different viewpoints and focusing the refracted images on a position that is apart for a predetermined distance (e.g., about 3 meters) that is called a viewing distance. Such a position where images are formed is called a viewing area. Accordingly, if one eye of a user is positioned at a first viewing area and the other eye is positioned at a second viewing area, the user can experience a 3D effect.

As an example, FIG. 1 is a view which explains the display operation of a multi-viewpoint image having 6 viewpoints in total. Referring to FIG. 1, the non-glasses 3D display device may enable light that corresponds to an image of a first viewpoint among 6 viewpoints to be projected onto the left eye and enable light that corresponds to an image of a second viewpoint among 6 viewpoints to be projected onto the right eye. Accordingly, the user views images of different viewpoints through the left eye and the right eye, and thus can experience a 3D effect.

Figure 2:
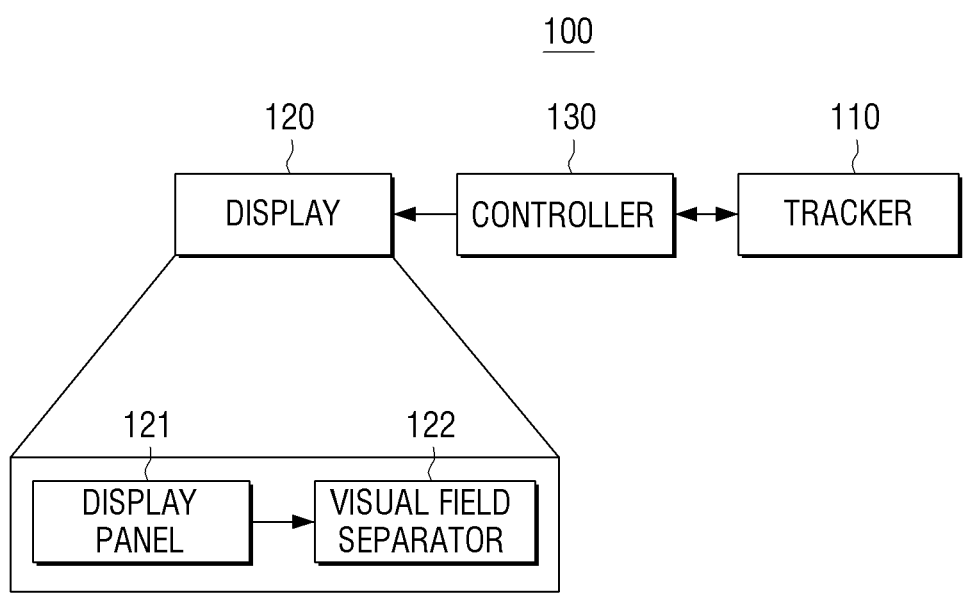
FIG. 2 is a block diagram which illustrates the configuration of a display device according to an exemplary embodiment.

FIG. 2 is a block diagram which illustrates the configuration of a display device according to an exemplary embodiment.

A display device 100 of FIG. 1 may be implemented by one of various types of display devices, such as a TV, a monitor, a mobile phone, a PDA, a PC, a set-top PC, a tablet PC, a digital photo frame, and a kiosk, but is not limited thereto.

Referring to FIG. 2, the display device 100 includes a tracker 110, a display 120 and a controller 130.

The tracker 110 tracks a user's position, specifically, a position of a user's face, and provides corresponding information to controller 130. To do this, the tracker 110 may include an image capturer (not illustrated) and a detector (not illustrated).

The image capturer (not illustrated) is arranged in a contour area of the display device 100. For example, the image capturer (not illustrated) may be arranged in an upper center, left center, or right center of a bezel area, but is not limited thereto.

The image capturer (not illustrated) captures an image of a user. The image capturer includes a lens module including lenses and an image sensor. An image that is input through the lens is input, as an optical signal, to the image sensor that serves as a film, and the image sensor converts the input optical signal into an electrical signal to transfer the converted electrical signal to the detector (not illustrated).

The detector (not illustrated) detects a position of a user's face from the captured image of the user that is received from the image capturer, and tracks the position of the user's face. Specifically, the detector (not illustrated) may track the moving position of the user based on the position of the user's face area that is detected from the previous frame and the current frame, and provide corresponding information to controller 130.

As a method of detecting a face area, one of various methods in the related art may be used. Specifically, a direct recognition method or a method using statistics may be used. According to the direct recognition method, a rule is established using physical characteristics, such as contours of a face image that appears on a screen, skin colors, and sizes or distances of constituent elements. Comparison, investigation and measurement are performed according to the rule. In the method of using statistics, a face area may be detected according to a pre-learned algorithm.

That is, inherent features of an input face are processed as data, and the processed data is compared with a pre-stored database (faces and shapes of other objects). In particular, MLP (Multi Layer Perception) or SVM (Support Vector Machine) method may be used to detect the face area according to the pre-learned algorithm. A detailed explanation thereof will be omitted.

The display 120 functions to provide a multi-view (or optical multi-view). For this, the display 120 includes a display panel 121 and a visual field separator 122 to provide the multi-view.

The display panel 121 includes a plurality of pixels, each of which is composed of a plurality of sub-pixels. Here, the sub-pixels may be composed of R (Red), G (Green) and B (Blue). That is, a plurality of pixels, each of which is composed of sub-pixels of R, G and B, are arranged in a plurality of rows and columns to form a display 121. In this case, the display panel 121 may be implemented by various display units, such as LCD (Liquid Crystal Display) panel, PDP (Plasma Display Panel), OLED (Organic Light Emitting Diode), VFD (Vacuum Fluorescent Display), FED (Field Emission Display), and ELD (Electro Luminescence Display).

The display panel 121 displays image frames. Specifically, the display panel 121 may display image frames in which a plurality of images having different viewpoints are repeated in order to be sequentially arranged.

On the other hand, although not illustrated in FIG. 2, in the case where the display panel 121 is implemented as an LCD panel, the display device 100 may further include a backlight (not illustrated) configured to supply backlight to the display panel 121 and a panel driver (not illustrated) configured to drive pixels of the display panel 121 in accordance with pixel values of the pixels which constitute the image frame.

Through this, in response to light that is generated from the backlight (not illustrated) being incident to respective pixels of the display panel 121, the display panel 121 displays the image frames through adjustment of the transmission rate of the light that is incident to the pixels, in accordance with an image signal. Specifically, the display panel 121 includes a liquid crystal layer and two electrodes that are formed on both surfaces of the liquid crystal layer. If a voltage is applied to the two electrodes, an electric field is generated to move molecules of the liquid crystal layer between the two electrodes.

The visual field separator 122 may be arranged on the front surface of the display panel 121 to provide a multi-view having different viewpoints, by viewing areas. In this case, the visual field separator 122 may be implemented by a lenticular lens or as a parallax barrier.

For example, the visual field separator 122 may be implemented by a lenticular lens that includes a plurality of lens areas. Accordingly, the lenticular lens can refract an image that is displayed on the display panel 121 through the plurality of lens arrays. Each lens area is formed with a size that corresponds to at least one pixel, and differently disperses the light transmitting the respective pixels by viewing areas.

As another example, the visual field separator 122 may be implemented by a parallax barrier. The parallax barrier is implemented by a transparent slit array including a plurality of barrier areas. Accordingly, the parallax barrier operates to emit different viewpoint images by viewing areas through blocking of the light through the slits between the barrier areas.

On the other hand, the visual field separator 122 may be inclined at a predetermined angle to improve picture quality. The controller 130 may divide image frames of a respective image, which are captured at a plurality of viewpoints, based on the inclined angle of the visual field separator 122, and may generate the image frames through combination thereof. Accordingly, a user does not view an image that is displayed in a vertical or horizontal direction on the sub-pixels of the display panel 121, but views an image that is displayed with a predetermined inclination on the sub-pixels.

Figure 3:
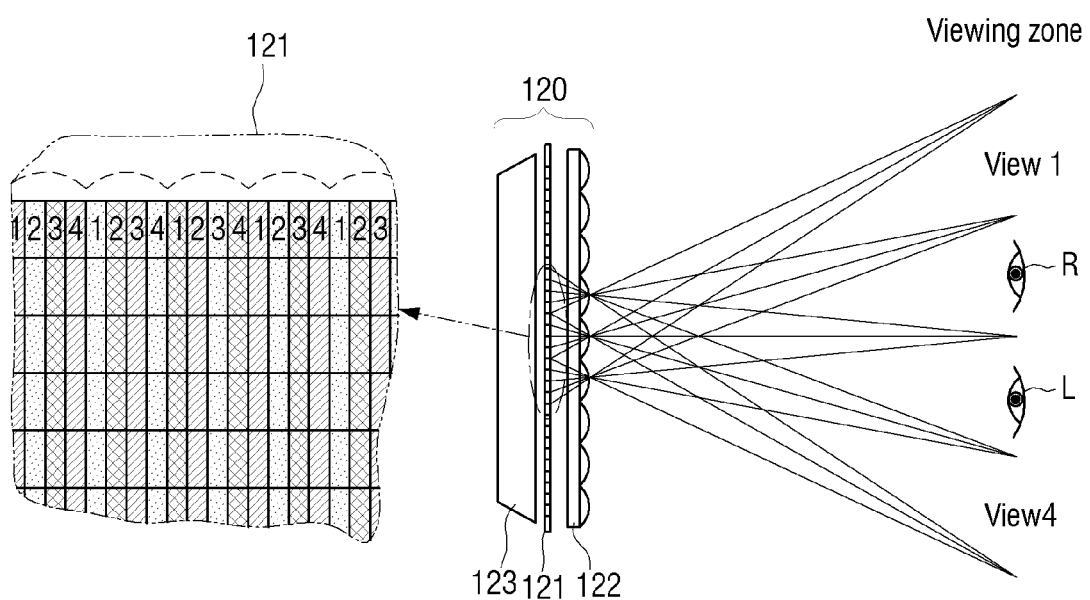
FIG. 3 is a view which explains an implementation example of a display according to an exemplary embodiment.

FIG. 3 is a view which explains an implementation example of a display 120, according to an exemplary embodiment.

Referring to FIG. 3, the display 121 includes a display panel 121, a visual field separator 122 and a backlight 123.

In FIG. 3, it is exemplified that the visual field separator 122 is implemented by a lenticular lens array.

Referring to FIG. 3, the display panel 121 includes a plurality of pixels that are grouped into a plurality of columns. An image at a different viewpoint is arranged for each column. Referring to FIG. 3, a plurality of images 1, 2, 3, and 4 at different viewpoints are repeated to be sequentially arranged. That is, the respective pixel columns are arranged as numbered groups 1, 2, 3, and 4. A graphic signal that is applied to the panel is arranged in a manner that pixel column 1 displays a first image, and pixel column 2 displays a second image.

The backlight 123 provides light to the display panel 121. By light that is provided from the backlight 123, images 1, 2, 3, and 4, which are formed on the display panel 121, are projected onto the visual field separator 122, and the visual field separator 122 disperses the respective projected images 1, 2, 3, and 4 and transfers the dispersed images in a direction toward the viewer. That is, the visual field separator 122 generates exit pupils at the viewer's position, that is, at a viewing distance. The thickness and diameter of a lenticular lens in the case where the visual field separator is implemented by the lenticular lens array and the slit spacing in the case where the visual field separator is implemented by the parallax barrier may be designed so that the exit pupils that are generated by the respective columns are separated in an average inter-pupillary distance of less than 65 mm. The separated image lights form the viewing areas, respectively. That is, in the case where first to fourth views are formed as illustrated in FIG. 3, and the user's left eye and right eye are positioned at second and third views, respectively, the viewer can view a 3D image.

The controller 130 controls the overall operation of the display device 100.

In particular, the controller 130 may operate to render and display the image frames so that different views are positioned to be spaced apart by a predetermined distance from each other in a reference viewing area, based on the difference between the display panel 121 and the visual field separator 122. In this case, the respective views may be generated using a plurality of virtual viewpoint images, and this will be described in detail with reference to the drawings.

Further, controller 130 may shift positions of the multi-view and provide the shifted multi-view so that two specific views of the multi-view are provided as user's left-eye and right-eye images even when the user's position is changed.

Specifically, the controller 130 may select first and second target views from the multi-view, and shift the positions of the multi-view so that a user views the first and second target views always as the left-eye and right-eye images based on the position of the user's face.

On the other hand, according to an exemplary embodiment, the controller 130 may provide the first target view in replacement of the remaining views that are positioned in the same direction as the first target view that is selected from the multi-view that is provided through the display 120, and may provide the second target view in replacement of the remaining views that are positioned in the same direction as the second target view that is selected from the multi-view.

In this case, the controller 130 may select first and second target images (or target sub-views) from among virtual viewpoint images constituting the multi-view, may provide the selected first target image in replacement of all of the images that constitute the first target view and the remaining target views positioned in the same direction as the first target view, and may provide the second target image in replacement of all of the images that constitute the second target view and the remaining target views positioned in the same direction as the second target view.

Further, the controller 130 may perform filtering of the left-eye and right-eye images in accordance with disparity sizes of the selected first target image and second target image, that is, the left-eye and right-eye images. In this case, the controller 130 may perform image processing, such as sharpening, blurring, and darkening, in accordance with the disparity sizes of the left-eye and right-eye images.

Equation 1 below is an equation that is used to perform sharpening.

$$O=wI(1-w)\{I*H\} \quad \text{[Equation 1]}$$

Here, O denotes f filtered left/right image, ω denotes disparity-based weighting, I denotes an input left/right image, and H denotes a high-pass filter.

Equation 2 below is an equation that is used to perform blurring.

$$O=wI+(1-w)\{I*L\} \quad \text{[Equation 2]}$$

Here, O denotes f filtered left/right image, ω denotes disparity-based weighting, I denotes an input left/right image, and L denotes a low-pass filter.

Equation 3 below is an equation that is used to perform darkening.

$$O=wI \quad \text{[Equation 3]}$$

Here, O denotes f filtered left/right image, ω denotes disparity-based weighting, and I denotes an input left/right image.

Further, the controller 130 may adjust the luminance of a predetermined number of sub-views that are adjacent to the first and second target views of the multi-view below a predetermined luminance value, and may provide the luminance-adjusted sub-views.

As an example, the controller 130 may adjust the luminance of N sub-views that are adjacent to the first target view of the multi-view and M sub-views that are adjacent to the second target view below predetermined luminance values in order to provide the luminance-adjusted sub-views. Here, N and M may be equal to or different from each other.

For example, in the case where seven views, each of which is composed of five sub-views, exist in a multi-view, and the third and fourth views of the multi-view are selected as the first and second target views, the luminance of 8 sub-views that are adjacent to the third and fourth views may be adjusted to be below a predetermined luminance value.

In this case, the controller 130 may adjust the luminance values so that the sub-views have lower luminance values in reverse proportion to distances of the first and second target views and the predetermined number of sub-views. In the above-described example, the luminance may be adjusted so that the sub-view, which is most adjacent to the third view among 8 sub-views that are adjacent to the third view, has the lowest luminance value, and the luminance values of the remaining sub-views are gradually increased according to the distances measured with respect to the first and second target views. Further, with respect to the fourth view, the luminance values may be adjusted in the same manner.

As another example, the controller 130 may adjust the luminance of the sub-views which constitute the views that are respectively adjacent to the first and second target views of the multi-view below a predetermined luminance value, and may provide the luminance-adjusted sub-views.

In the above-described example, the luminance of the second view that is adjacent to the third view and the fifth view that is adjacent to the fourth view may be adjusted to be below a predetermined luminance value, and the luminance-adjusted view may be provided.

In this case, the controller 130 may adjust the luminance of a predetermined number of sub-views which constitute views that are adjacent to the first and second target views selected from the multi-view, to luminance values to which weight values according to distances measured with respect to the first and second target views, and may provide the luminance-adjusted sub-views. In the above-described example, the luminance values may be adjusted so that a plurality of virtual viewpoint images constituting the second view that is adjacent to the third view have lower luminance values in reverse proportion to the distances with the third view.

As another example, the controller 130 may adjust the luminance of the remaining views, except for the first and second target views selected from the multi-view, to luminance values to which weight values according to distances measured with respect to the first and second target views in the same direction as the first and second target views, and may provide the luminance-adjusted remaining views.

Specifically, the controller 130 may adjust the luminance of the remaining views so that the luminance is decreased in reverse proportion to the distance between the first target view and the remaining views positioned in the same direction as the first target view, and may adjust the luminance of the remaining views so that the luminance is decreased in reverse proportion to the distance between the second target view and the remaining views positioned in the same direction as the second target view. In this case, the remaining views, except for the first and second target views, may have luminance values that are relatively lower than the luminance values of the first and second target views. For example, in the case where seven views exist in a multi-view, and the third and fourth views of the multi-view are selected as the first and second target views, the luminance of the first and second views may be adjusted so that the luminance is decreased in reverse proportion to the distance between the first and second views positioned in the same direction as the third view and the third view. That is, in the case where the luminance of the second view is adjusted to the first luminance value that is lower than the predetermined luminance value, the luminance value of the first view may be adjusted to the second luminance value that is higher than the first luminance value. Further, with respect to the fourth to seventh views that are positioned in the same direction as the fourth view, the luminance values may be adjusted by applying the same rule.

Even in this case, the luminance may be adjusted so that a plurality of sub-views constituting the same view have luminance values to which different weight values are applied according to the distances with the target view.

The first and second exemplary embodiments as described above will be described in more detail with reference to the drawings.

Figure 4A:
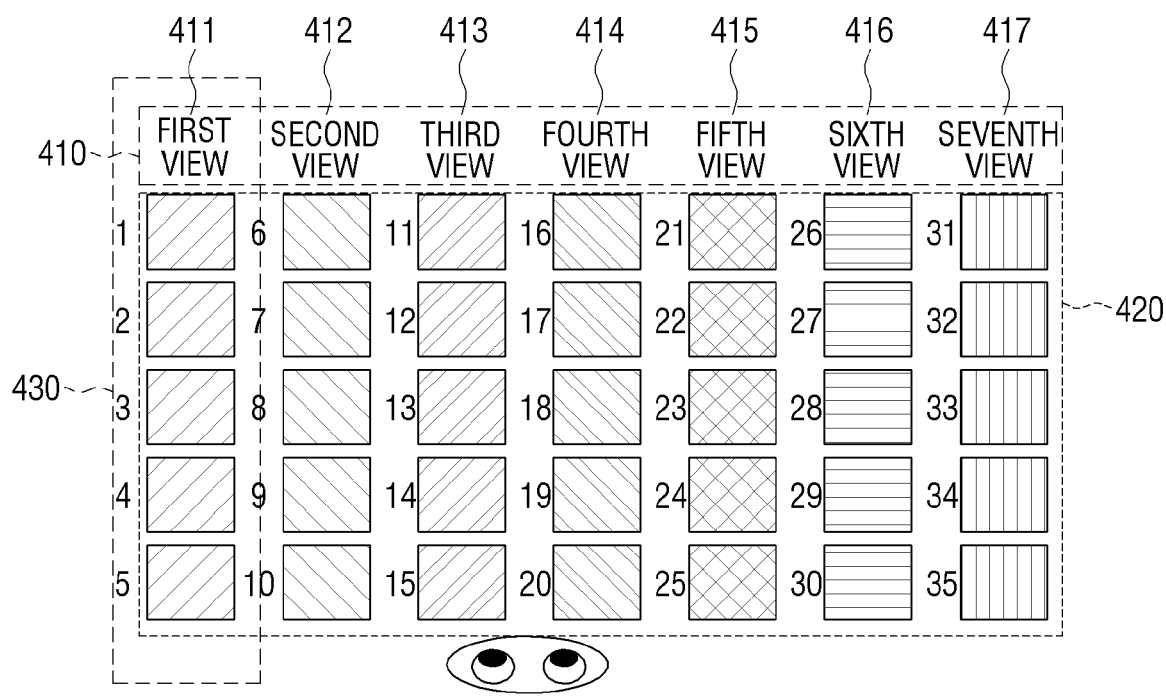
FIGS. 4A to 4C are views which explain a method of forming a multi-view according to an exemplary embodiment.
Figure 4B:
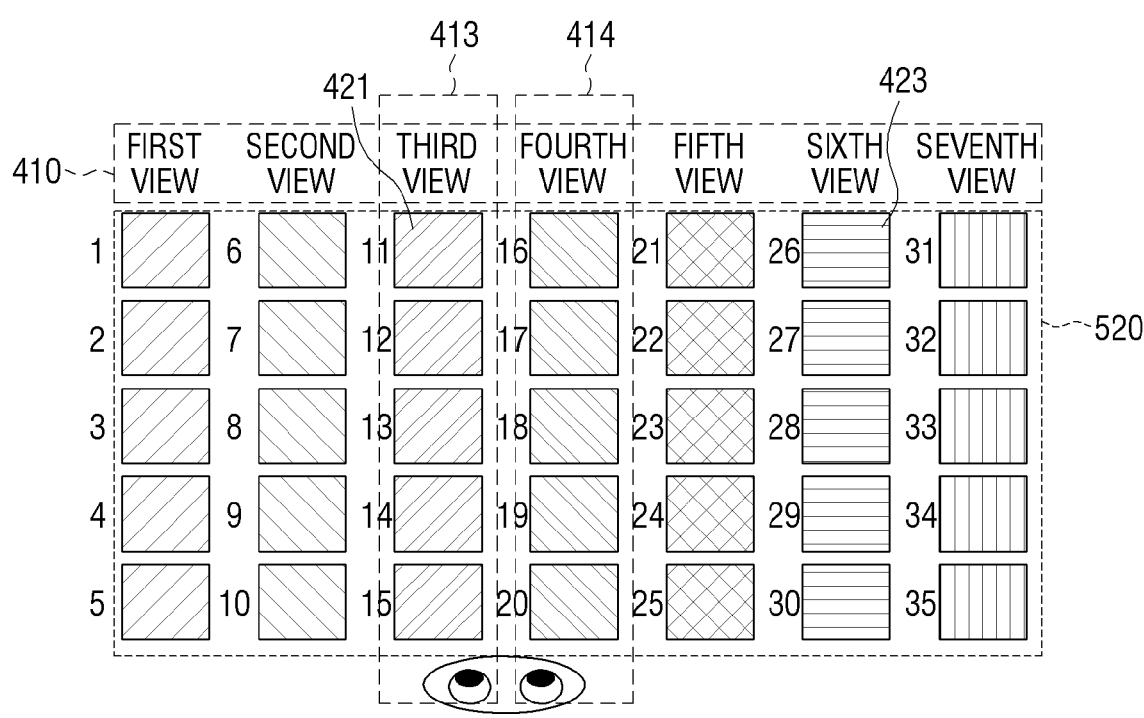
Figure 4C:
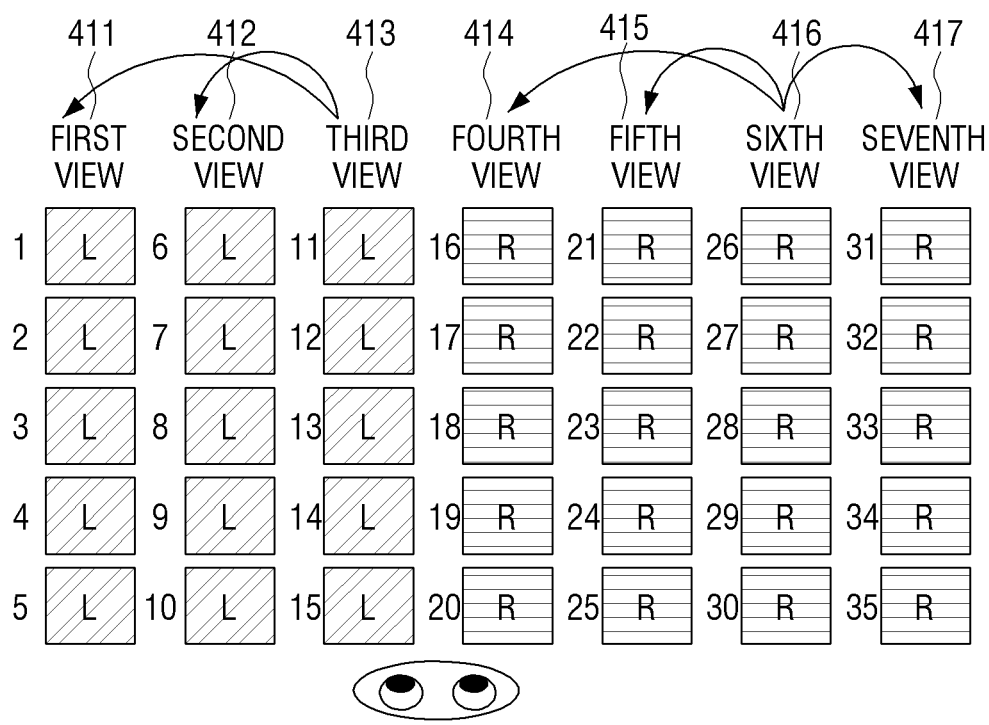

FIGS. 4A to 4C are views explaining a method for forming a multi-view according to a first exemplary embodiment.

FIG. 4A is a view which explains a general multi-view configuration.

As illustrated in FIG. 4A, a display device 100 may provide seven views 411 to 417, and each view may be composed of five sub-views (or virtual viewpoint images). That is, a multi-view that is composed of seven views 411 to 417 may be generated using 35 (1 to 35) sub-views 420 in total. For example, the first view 411 may be generated by synthesizing the sub-views 1 to 5. In this case, in response to the disparity of the adjacent view being A, the disparity of the adjacent sub-view becomes A/5. Further, the disparity of the left-eye and the right-eye becomes A that is the disparity of the adjacent view.

FIG. 4B is a view which explains a method of selecting a target view and a target image, according to second exemplary embodiment.

As illustrated in FIG. 4B, two of seven views 411 to 417 of the multi-view are selected as target views. As an example, the third and fourth views 413 and 414 may be selected as target values, that is, left-eye and right-eye views.

Further, two images of a plurality of sub-views 420 are selected as target images. As an example, $11^{th}$ virtual image and $26^{th}$ sub-views 421 and 423 may be selected as target images, that is, left-eye and right-eye images.

FIG. 4C is a view which explains a method of configuring a multi-view using selected target view and target images according to an exemplary embodiment.

As illustrated in FIG. 4C, the selected third view 413 and the first and second views 411 and 412, which are views positioned in the same direction as the third view 413, are overwritten (or replaced) by the first target image 421, and the selected fourth view 414 and the fifth to seventh views 415 to 417, which are views positioned in the same direction as the selected fourth view 414 are overwritten by the second target image 423. Through this, view points which correspond to the third view 413, to which the selected first target view 421 belongs, and the sixth view 416, to which the selected second target view 423 belongs, are provided to the left eye and the right eye, respectively. Accordingly, the disparity between the left eye and the right eye is widened from disparity A according to the adjacent view as described above with reference to FIG. 4A to 3A, and the adjacent view is replaced by the same image as the target image in order to reduce crosstalk.

Figure 5:
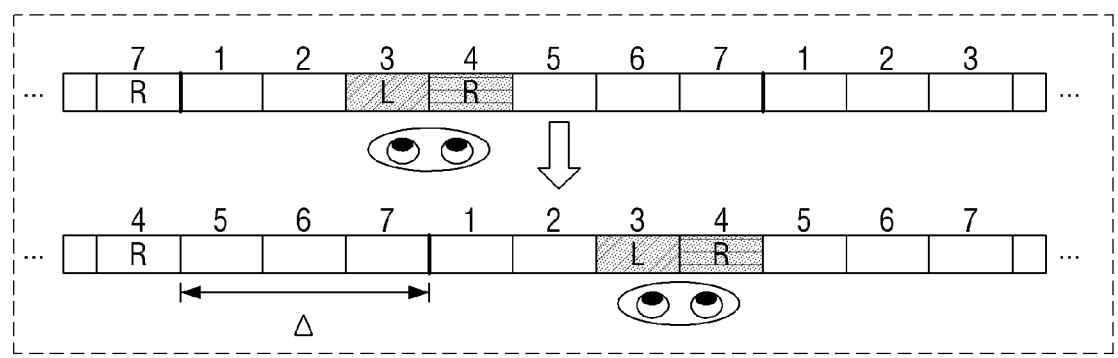
FIG. 5 is a view which explains a method of providing a 3D image according to tracking of a user position according to an embodiment of the present disclosure.

FIG. 5 is a view which explains a method of providing a 3D image according to tracking a user position according to an exemplary embodiment.

As illustrated in FIG. 5, according to the exemplary embodiments, a user position is tracked, and the positions of views are shifted to be provided according to the tracked position. A provided multi-view may be a view as illustrated in FIG. 4C, but is not limited thereto. That is, a multi-view according to the exemplary embodiments as described above may be shifted to be provided according to the position of the user.

Specifically, the positions of the views may be shifted so that a user can always view the same view as the left-eye and right-eye views through user face tracking. That is, in response to the user's position being changed, as illustrated in the drawing, the positions of the views may be shifted to be provided so that the third and fourth views are always recognized by the left eye and the right eye of the user. Through this, crosstalk is reduced, and a stereoscopic 3D image can be provided at any position.

Figure 6A:
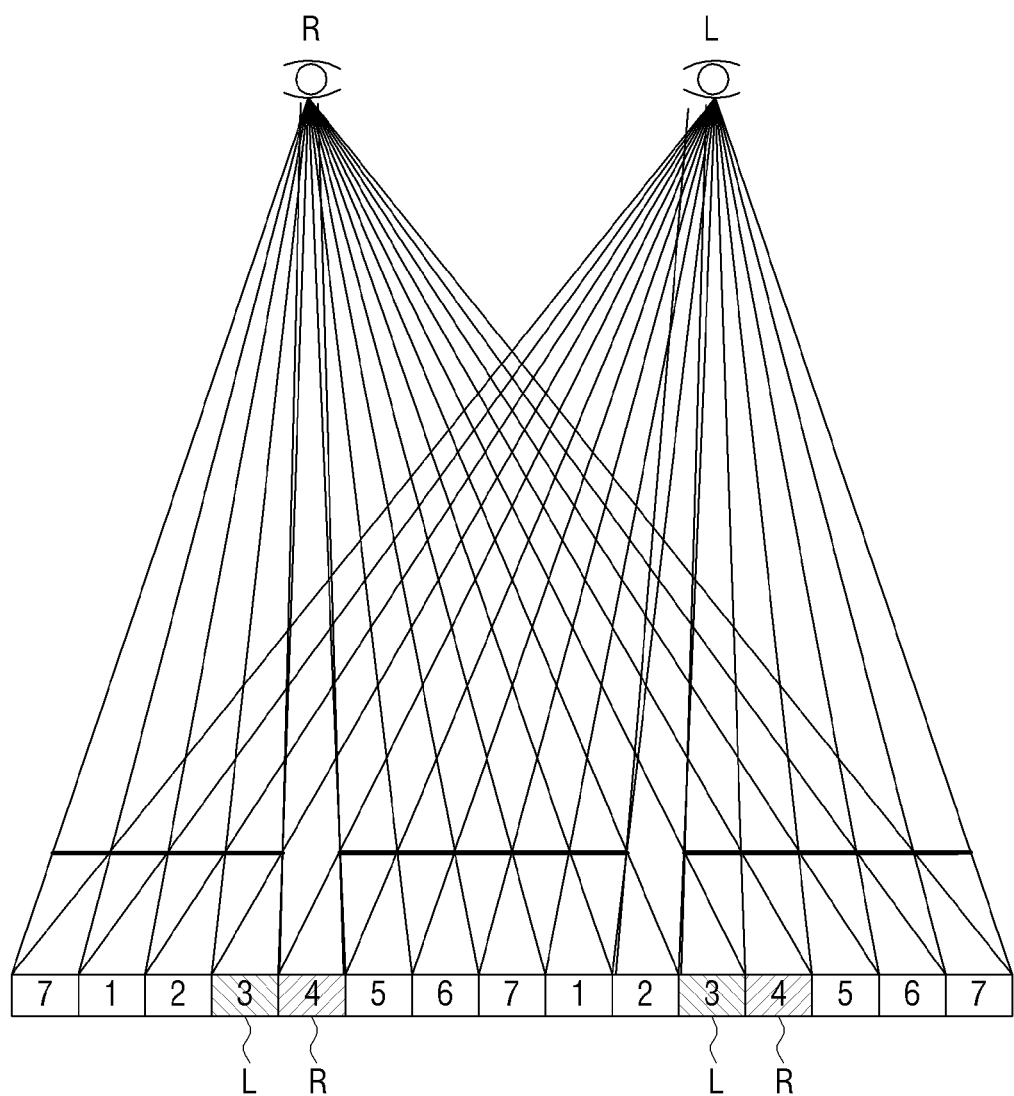
FIGS. 6A to 6C are views which explain in detail a method of providing a 3D image in response to tracking a user position, according to an exemplary embodiment.
Figure 6B:
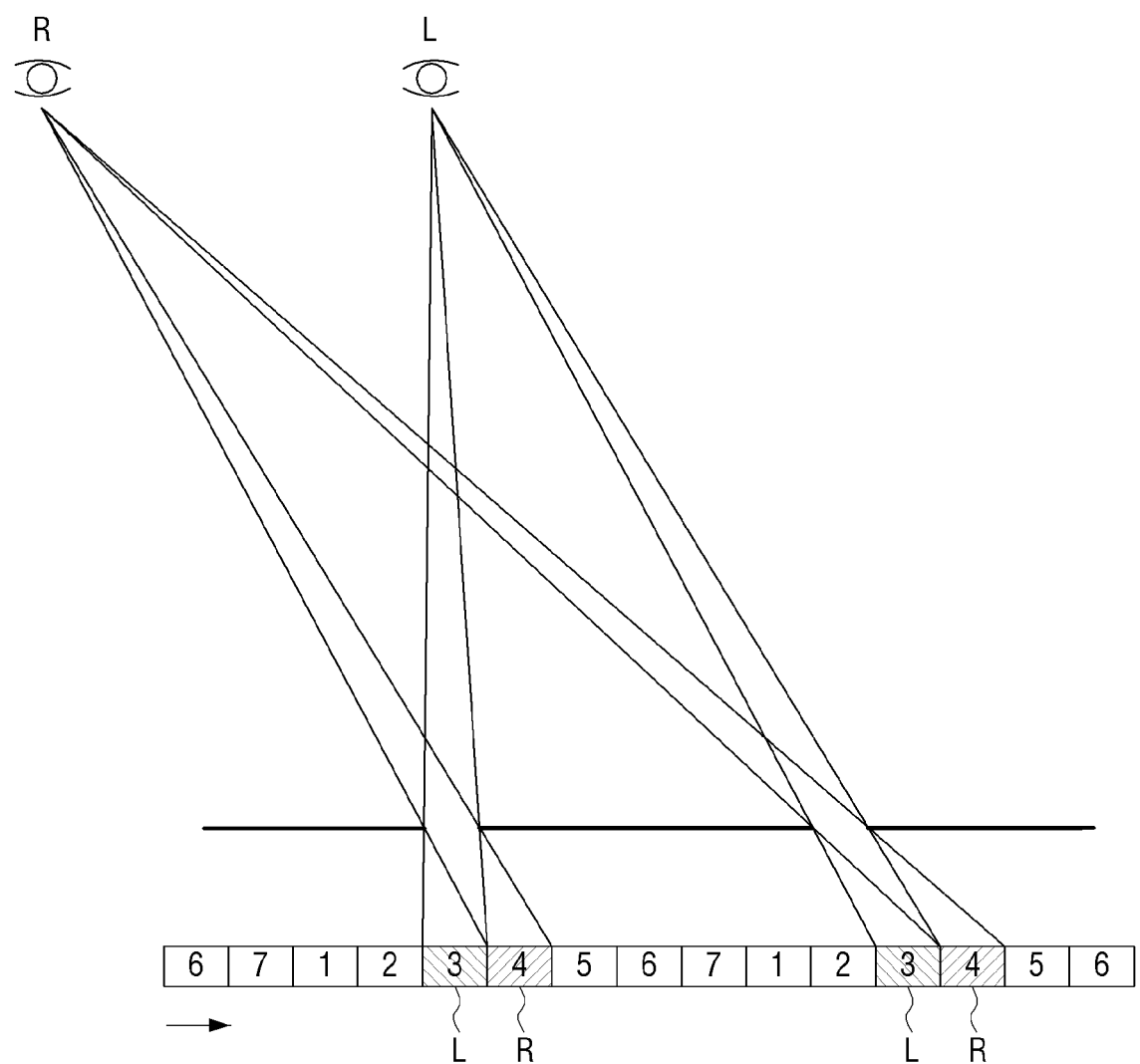
Figure 6C:
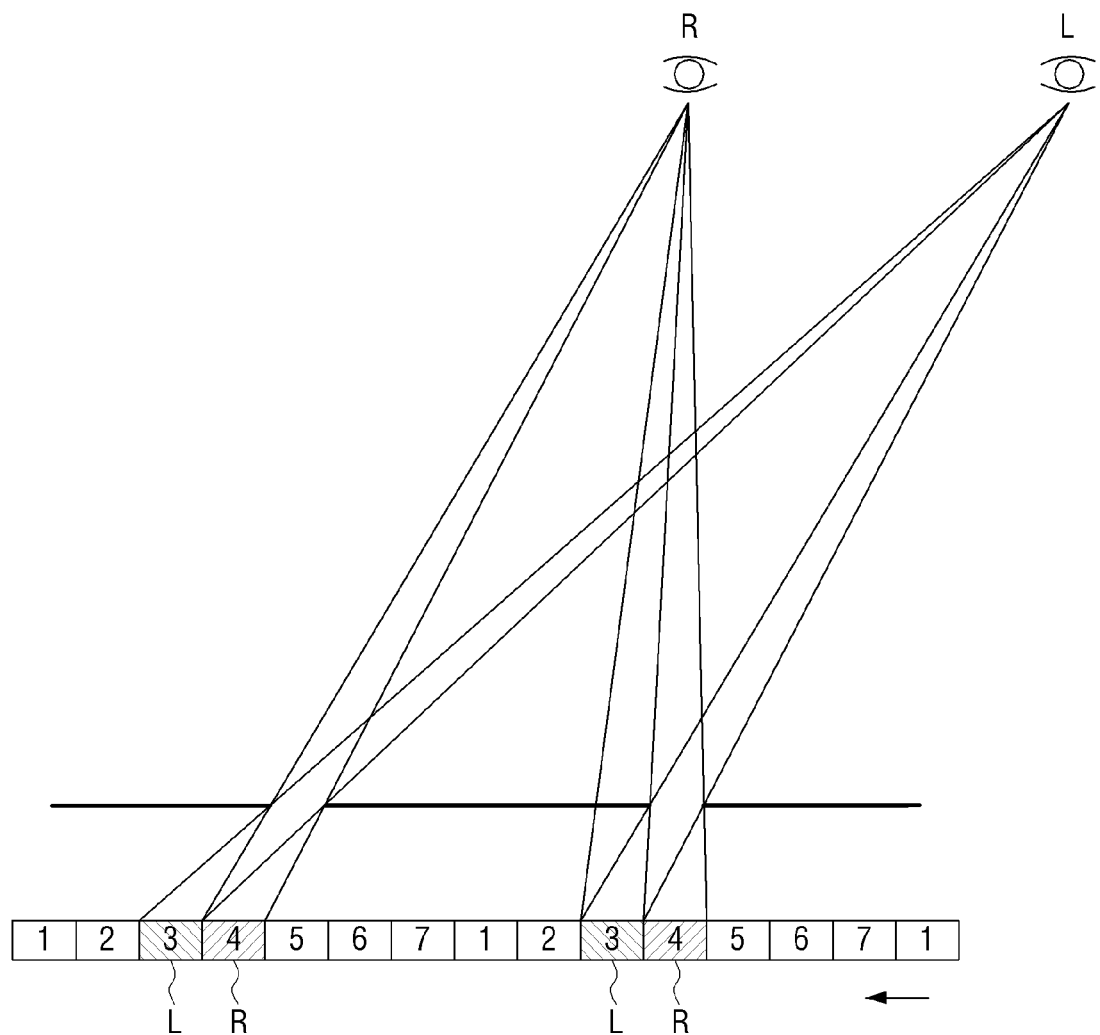

FIGS. 6A to 6C are views which explain in detail a method of providing a 3D image according to tracking of a user position, according to an exemplary embodiment.

As illustrated in FIG. 6A, an assumption is made that the third and fourth views from among seven views of a multi-view are recognized by the left eye and the right eye of the user to provide a 3D image.

Then, as illustrated in FIG. 6B, in response to the user position being shifted to the left, the position of the multi-view is appropriately shifted, and the third and fourth views are recognized by the left eye and the right eye of the user, respectively, even when the user's position shifted, as described above.

Further, as illustrated in FIG. 6C, in response to the user position being shifted to the right, the position of the multi-view is appropriately shifted, and the third and fourth views are recognized by the left eye and the right eye of the user, respectively, even in the user's position shifted, as described above.

Accordingly, the user can recognize the third and fourth views as the left-eye and right-eye images, respectively, in any position, and thus a clear natural 3D image can be provided.

Figure 7A:
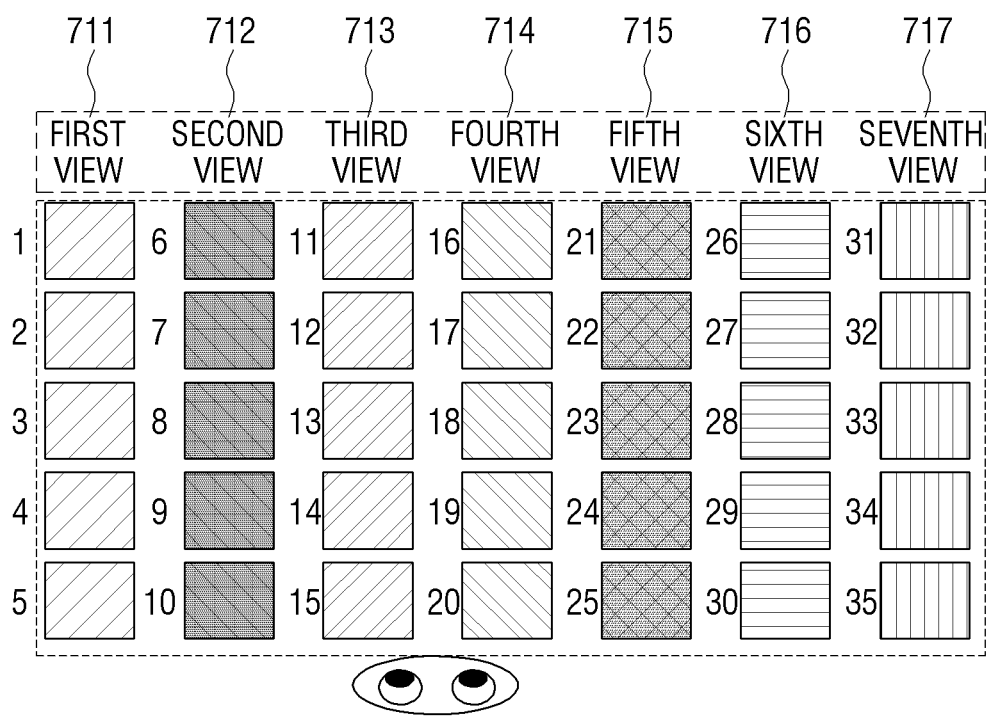
FIGS. 7A to 7C and 8 are views which explain a method of providing a 3D image according to another exemplary embodiment.
Figure 7B:
Figure 7C:
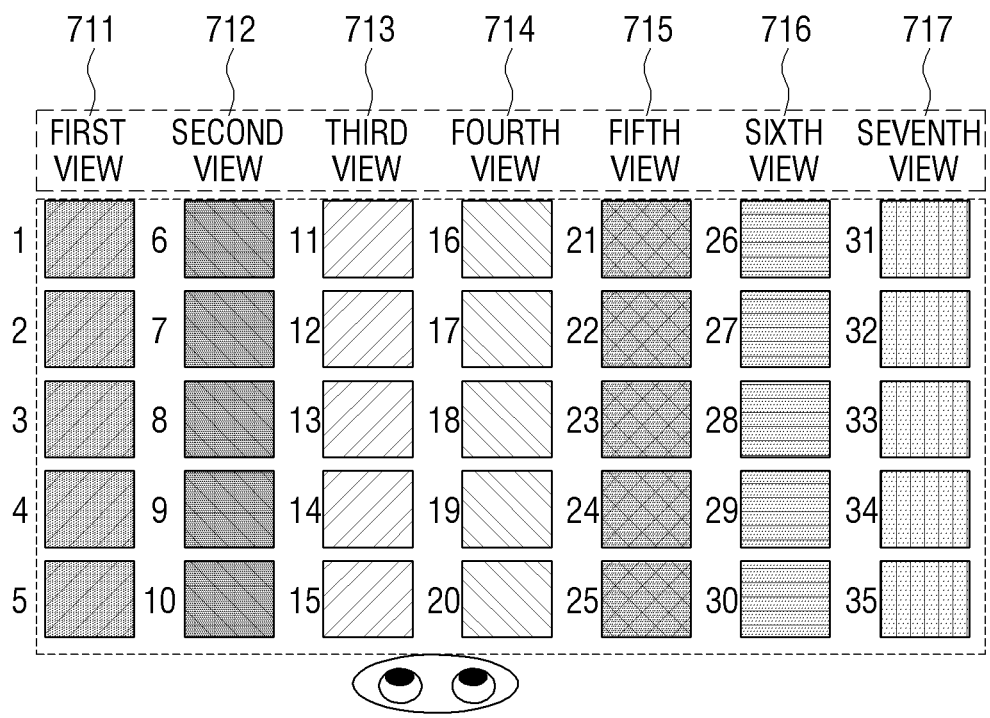

FIGS. 7A to 7C are views which explain a method of providing a 3D image according to an exemplary embodiment.

As illustrated in FIG. 7A, in response to views that are recognized by the left eye and the right eye of a user being the third view 713 and the fourth view 714, the luminance of the second view 712 and the fifth view 715 that are respectively adjacent to the third view 713 and the fourth view 714 may be adjusted below a predetermined threshold value to display the luminance-adjusted views.

Further, as illustrated in FIG. 7B, the luminance of sub-views (or virtual viewpoint images), which constitute the second view 712 and the fifth view 715 which are respectively adjacent to the third view 713 and the fourth view 714 that are recognized by the left eye and the right eye of the user, may be provided differently. Specifically, the sub-view 10 that is adjacent to the third view 713 from among five sub-views 6 to 10 which constitute the second view 712 may be provided with the lowest luminance value, and the remaining sub-views 6 to 9 may be provided with luminance values that are gradually increased in the order of 9→8→7→6. Further, the sub-view 21 that is adjacent to the fourth view 714 among five sub-views 21 to 25 constituting the fifth view 715 may be provided with the lowest luminance value, and the remaining sub-views 22 to 25 may be provided with luminance values that are gradually increased in the order of 22→23→24→25. This exemplary embodiment will be described in more detail with reference to FIG. 8.

Further, as illustrated in FIG. 7C, the second view 712 and the fifth view 715, which are respectively adjacent to the third view 713 and the fourth view 714 that are recognized by the left eye and the right eye of the user, may be provided with luminance values that are below the predetermined value, and the views that are adjacent in an opposite direction may be provided with gradually increased luminance. That is, the luminance of the first view 711 that is adjacent to the second view 712 may be higher than the luminance of the second view 712, and the luminance of the sixth view 716 and the seventh view 717 adjacent to the fifth view 715 may be gradually increased. However, although the luminance value is gradually increased, it may not exceed the luminance values of the third view 713 and the fourth view 714 that are the target views.

Although not illustrated in the drawing, even in the case of the exemplary embodiment of FIG. 7C, the sub-views constituting the same view may be provided with different luminance values in the method, as shown in FIG. 7B.

In the above-described exemplary embodiments, a description is provided where all the luminance values of the sub-views constituting the view are adjusted or are not adjusted. However, this is merely exemplary, and the luminance of a part of the sub-views constituting the same view may be adjusted whereas the luminance of the other part thereof may not be adjusted. For example, in the case where the luminance values of eight sub-views that are adjacent to the third view 713 that is the target view are adjusted, the luminance values of five sub-views 6 to 10 constituting the second view 712 are all adjusted, but the luminance values of only three sub-views 3 to 5 among five sub-views constituting the first view 711 may be adjusted while the luminance values of the two sub-views 1 and 2 may not be adjusted.

Even in the case of a multi-view as illustrated in FIGS. 7A and 7B, the position of the multi-view may be shifted to be provided according to the user face tracking as illustrated in FIGS. 5 and 6A to 6C.

Figure 8:
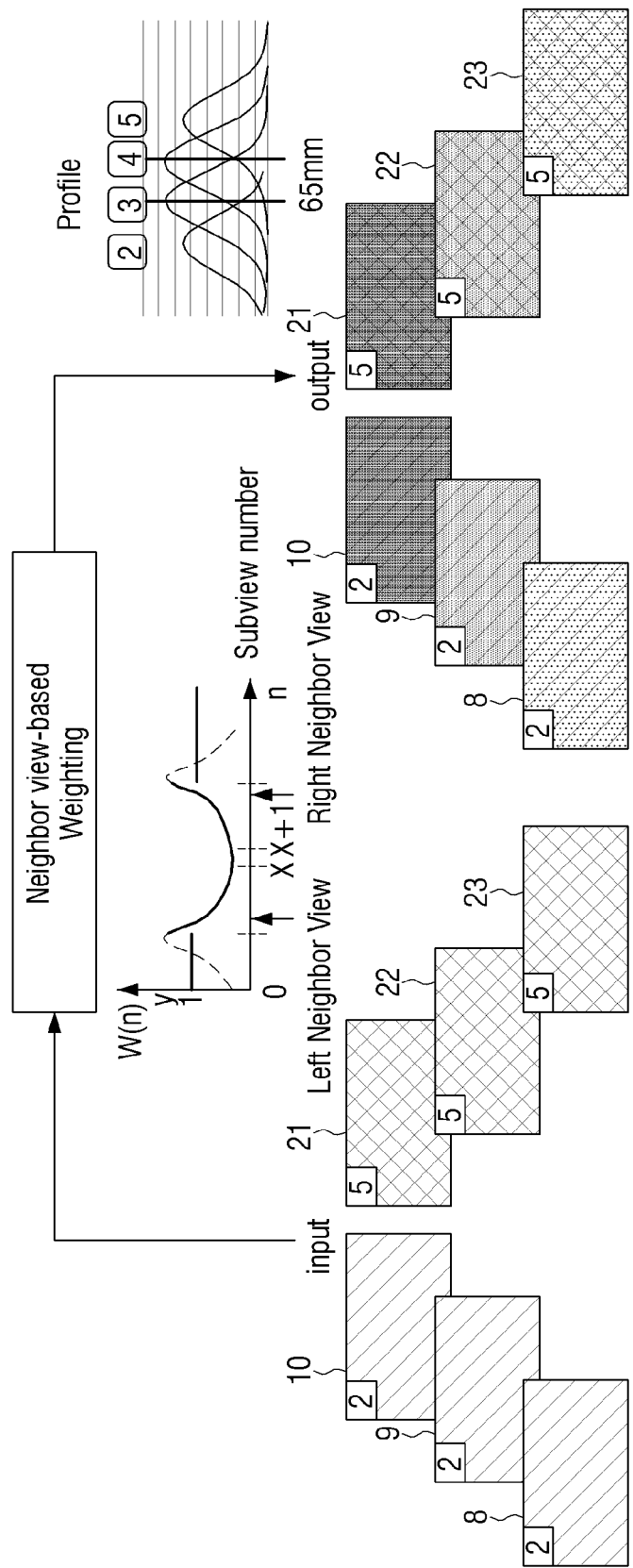

FIG. 8 is a view which explains a method of providing a 3D image, as illustrated in FIG. 7B.

As illustrated in FIG. 8, the luminance of sub-views, which constitute the second view 712 and the fifth view 715 that are respectively adjacent to the third view 713 and the fourth view 714 that are recognized by the left eye and the right eye of the user, may be provided differently according to predetermined weight values.

The left side of FIG. 8 shows the luminance of the sub-views 10 to 8 and 21 to 23 that constitute the second view 712 and the fifth view 715 prior to the luminance adjustment according to the predetermined weight values being applied, and the right side of FIG. 8 shows the luminance of the sub-views 10 to 8 and 21 to 23 that constitute the second view 712 and the fifth view 715 after the luminance adjustment according to the predetermined weight values being applied.

In response to luminance adjustment according to the predetermined weight values, according to an exemplary embodiment being applied as illustrated, the sub-view 10 that is adjacent to the third view 713 among five sub-views 6 to 10 constituting the second view 712 that is adjacent to the third view 713 may be provided with the lowest luminance value, and the remaining sub-views 6 to 9 may be provided with luminance values that are gradually increased in the order of 9→8→7→6. Further, the sub-view 21 that is adjacent to the fourth view 714 among five sub-views 21 to 25 constituting the fifth view 715 that is adjacent to the fourth view 714 may be provided with the lowest luminance value, and the remaining sub-views 22 to 25 may be provided with luminance values that are gradually increased in the order of 22→23→24→25.

Equation 4 below is an equation that provides a weight value according to the distance of sub-views constituting a view that is adjacent to a target view.

$$w(|x|) = e^{-\frac{(|x|-m)^2}{2c^2}}$$ [Equation 4]

Here, |x| denotes the number of sub-views of which luminance values are to be adjusted, c denotes an average dispersion, and m denotes the number of sub-views of one view. In this case, c may be a value that is pre-defined by a user.

On the other hand, equation 5 below is an equation that gives a weight value according to the size of disparity.

$$w(d) = e^{-\frac{(d-128)^2}{2c^2}}$$ [Equation 5]

Here, d denotes a disparity value (0≤d≤255), and c denotes an average dispersion value.

Figure 9:
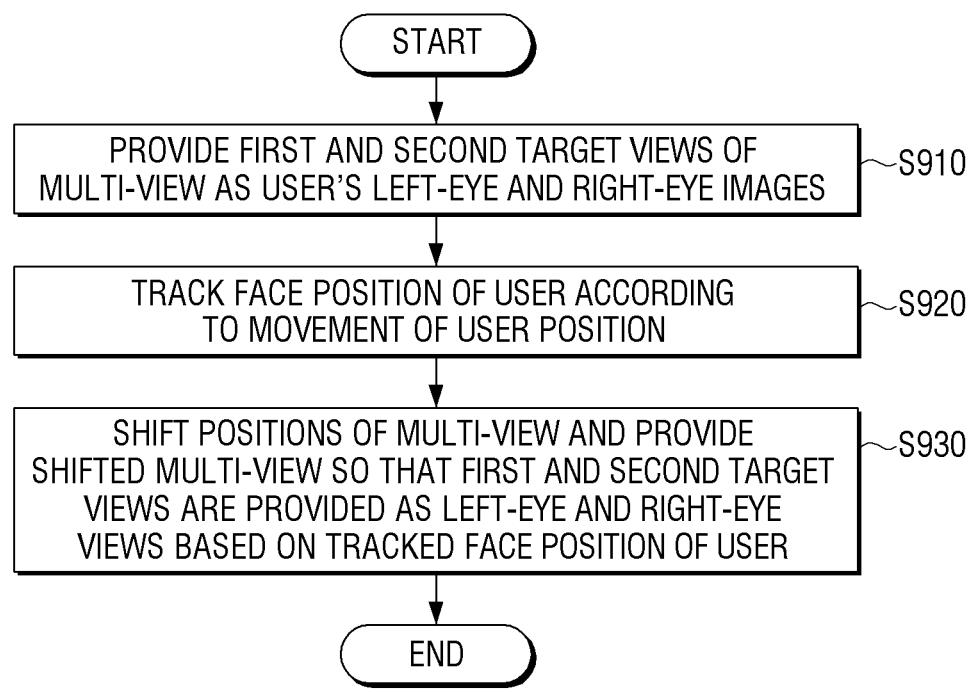
FIG. 9 is a flowchart which illustrates a method of controlling a display device according to an exemplary embodiment.

FIG. 9 is a flowchart which explains a method of controlling a display device according to an exemplary embodiment.

According to the method of controlling a multi-viewpoint image display device illustrated in FIG. 9, the first and second target views of the multi-view are selected and provided as user's left-eye and right-eye images (S910).

A face position of a user according to shifting of a user position is then tracked (S920).

Thereafter, positions of the multi-view are shifted and the shifted multi-view is provided so that the first and second target views are provided as the left-eye and right-eye images, based on the tracked position of the face of the user (S930).

The multi-viewpoint image display device may include a display panel on which a plurality of images having different viewpoints are repeated, in order to be sequentially arranged. A visual field separator may be arranged in front of the display panel in order to provide the multi-view which corresponds to the different viewpoints by viewing areas.

Further, in S910, the first target view may be provided in replacement of the remaining views that are positioned in the same direction as the first target view of the multi-view, and the second target view may be provided in replacement of the remaining views that are positioned in the same direction as the second target view of the multi-view.

Further, in S910, the first target image selected from a plurality of images that are repeated is to be arranged on the display panel may be provided in replacement of all the images that constitute the first target view and the remaining target views positioned in the same direction as the first target view, and the second target image may be provided in replacement of all the images that constitute the second target view and the remaining target views positioned in the same direction as the second target view.

Further, in S910, the luminance of views that are adjacent to the first and second target views selected from the multi-view may be adjusted below a predetermined luminance value to provide the luminance-adjusted views.

Further, in S910, the luminance of a plurality of images constituting views that are adjacent to the first and second target views selected from the multi-view may be adjusted to luminance values to which weight values according to distances measured with respect to the first and second target views are applied, and the luminance-adjusted images may be provided.

Further, in S910, the luminance of the remaining views except for the first and second target views that are selected from the multi-view may be adjusted to luminance values to which weight values according to distances that are measured with respect to the first and second target views in the same directions as the first and second target views, and the luminance-adjusted remaining views may be provided.

Further, in S910, the luminance of the remaining views may be adjusted so that the luminance is decreased in reverse proportion to distances between the remaining views positioned in the same direction as the first target view and the first target view, and the luminance of the remaining views may be adjusted so that the luminance is decreased in reverse proportion to distances between the remaining views positioned in the same direction as the second target view and the second target view.

As described above, according to the present disclosure, through the reduction of crosstalk of the non-glasses 3D display, a 3D effect can be increased.

The method of controlling a multi-viewpoint image display device according to various exemplary embodiments, as described above, may be implemented by a program, and the program may be provided to a display device.

As an example, a non-transitory computer readable storage medium may be provided, in which a program, which performs selecting and providing first and second target views of a multi-view as user's left-eye and right-eye images, tracking a face position of a user according to shifting a user shifting position, and shifting positions of the multi-view and providing the shifted multi-view, so that the first and second target views provided as the left-eye and right-eye images based on the tracked face position of the user, are stored.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray Disc™, a USB, a memory card, and a ROM.

While the disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A multi-viewpoint image display device comprising:
   a display configured to provide a multi-view that comprises a plurality of views;
   a tracker configured to track a position of a face of a user according to a shifting position of the user; and
   a controller configured to shift positions of the multi-view and to provide a shifted multi-view so that first and second target views of the multi-view are provided as left-eye and right-eye views of the user and first and second target images of the plurality of views are provided as left-eye and right-eye images of the user, based on the tracked position of the user's face,
   wherein the plurality of views comprises the first and second target views,
   wherein the controller is configured to replace the first target view and remaining target views positioned in a same direction as the first target view with a first target image positioned in the same direction as the first target view, and replace the second target view and remaining target views positioned in a same direction as the second target view with a second target image positioned in the same direction as the second target view,
   wherein the first target image and the second target image are sub-views of the plurality of views.

2. The multi-viewpoint image display device as claimed in claim 1, wherein the display comprises:
   a display panel on which a plurality of images having different viewpoints are repeated to be sequentially arranged; and
   a visual field separator arranged in front of the display panel to provide the multi-view which corresponds to the different viewpoints, by viewing areas, wherein the controller is configured to arrange the plurality of images to provide viewpoint corresponding to the first target image in the first target view and remaining target views positioned in a same direction as the first target view.

3. The multi-viewpoint image display device as claimed in claim 1, wherein the controller is configured to provide the first target view in replacement of the remaining views that are positioned in the same direction as the first target view, and provides the second target view in replacement of remaining views that are positioned in the same direction as the second target view.

4. The multi-viewpoint image display device as claimed in claim 1, wherein the controller is configured to adjust luminance of a predetermined number of sub-views that are adjacent to the first and second target views from among a plurality of sub-views that constitute the plurality of views below a predetermined luminance value, and provides the luminance-adjusted sub-views.

5. The multi-viewpoint image display device as claimed in claim 4, wherein the controller is configured to adjust the luminance of the predetermined number of sub-views that are adjacent to the first and second target views to luminance values to which weight values according to distances that are measured with respect to the first and second target views are applied, and provide the luminance-adjusted sub-views.

6. The multi-viewpoint image display device as claimed in claim 1, wherein the controller is configured to adjust luminance of the remaining views of the plurality of views from which the first and second target views are excluded to luminance values to which weight values according to distances that are measured with respect to the first and second target views in the same directions as the first and second target views are applied, and provides the luminance-adjusted remaining views.

7. The multi-viewpoint image display device as claimed in claim 6, wherein the controller is configured to adjust the luminance of each of the remaining views so that the luminance is decreased in reverse proportion to distances between each of the remaining views and the first target view, the each of the remaining views being positioned in the same direction as the first target view, and adjusts the luminance of the remaining views so that the luminance is increased in reverse proportion to distances between the each of the remaining views and the second target view, the each of the remaining views being positioned in the same direction as the second target view.

8. A method of controlling a multi-viewpoint image display device, the method comprising:
providing first and second target views of a multi-view as user's left-eye and right-eye views;
tracking a face position of a user according to a shifting position of the user; and
shifting positions of the multi-view and providing the shifted multi-view so that the first and second target views are provided as the left-eye and right-eye views of the user and first and second target images of the plurality of views are provided as left-eye and right-eye images of the user based on the tracked position of the face of the user;
wherein the multi-view comprises a plurality views comprising the first and the second target views,
wherein the shifting positions comprises providing a first target image positioned in a same direction as the first target view in replacement of the first target view and remaining target views positioned in the same direction as the first target view, and providing a second target image positioned in a same direction as the second target view in replacement of the second target view and remaining target views positioned in the same direction as the second target view,
wherein the first target image and the second target image are sub-views of the plurality of views.

9. The method for controlling a multi-viewpoint image display device as claimed in claim 8, wherein the multi-viewpoint image display device comprises:
a display panel on which a plurality of images having different viewpoints are repeated in order to be to be sequentially arranged; and
a visual field separator arranged in front of the display panel to provide the multi-view which corresponds to the different viewpoints, by viewing areas,
wherein the display panel is configured to arrange the plurality of images to provide a viewpoint corresponding to the first target image in the first target view and remaining target views positioned in a same direction as the first target view.

10. The method for controlling a multi-viewpoint image display device as claimed in claim 8, wherein the providing of the first and second target views as the user's left-eye and right-eye views provides the first target view in replacement of remaining views that are positioned in the same direction as the first target view of the multi-view, and provides the second target view in replacement of the remaining views that are positioned in the same direction as the second target view of the multi-view.

11. The method of controlling a multi-viewpoint image display device as claimed in claim 8, wherein each of the plurality of views comprises a plurality of sub-views, and the providing of the first and second target views as the user's left-eye and right-eye views adjusts a luminance of a predetermined number of sub-views that are adjacent to the first and second target views from among the plurality of sub-views that constitute the multi-view below a predetermined luminance value, and provides the luminance-adjusted sub-views.

12. The method of controlling a multi-viewpoint image display device as claimed in claim 11, wherein the providing of the first and second target views as the user's left-eye and right-eye views adjusts the luminance of the predetermined number of sub-views that are adjacent to the first and second target views to luminance values to which weight values according to distances that are measured with respect to the first and second target views are applied, and provides the luminance-adjusted sub-views.

13. The method of controlling a multi-viewpoint image display device as claimed in claim 8, wherein the providing of the first and second target views as the user's left-eye and right-eye views adjusts luminance of the remaining views except for the first and second target views that are selected from the multi-view, to luminance values to which weight values according to distances that are measured with respect to the first and second target views in the same directions as the first and second target views are applied, and provides the luminance-adjusted remaining views.

14. The method of controlling a multi-viewpoint image display device as claimed in claim 13, wherein the providing of the first and second target views as the user's left-eye and right-eye views adjusts the luminance of each of the remaining views so that the luminance is decreased in reverse proportion to distances between each of the remaining views and the first target view, the each of the remaining views being positioned in the same direction as the first target view, and adjusts the luminance of the remaining views so that the luminance is increased in reverse proportion to distances between each of the remaining views and the second target view, the each of the remaining views being positioned in the same direction as the second target view.

15. A multi-viewpoint image display device for providing a 3D effect while reducing crosstalk, the display device comprising:
- a tracker configured to track a position of a face of a user according to a shifting position of the user; and
- a controller configured to shift positions of a multi-view and provide a shifted multi-view image so that first and second target views of the multi-view are provided as left-eye and right-eye views of the user and first and second target images of the plurality of views are provided as left-eye and right-eye images of the user, based on the tracked position of the user's face; wherein a 3D effect is obtained even when the user changes position, wherein the multi-view comprises a plurality of views comprising the first and second target views;
- wherein the controller is configured to provide a first target image positioned in a same direction as the first target view in replacement of remaining views that are positioned in the same direction as the first target view, and to provide a second target image positioned in a same direction as the second target view in replacement of remaining views that are positioned in the same direction as the second target view,
- wherein the first target image and the second target image are sub-views of the plurality of views.

16. The image display device of claim 15, further comprising a display including a display panel and a visual field separator, the display configured to provide the multi-view image.

17. The image display device of claim 15, wherein the display panel provides a plurality of images having different viewpoints which are repeated to be sequentially arranged; and
- the visual field separator is arranged in front of the display panel to provide the multi-view which corresponds to the different viewpoints, by viewing areas,
- wherein the controller is configured to arrange the plurality of images to provide a viewpoint corresponding to the first target image in the first target view and remaining target views positioned in a same direction as the first target view.

18. The multi-viewpoint image display device as claimed in claim 15, wherein the controller is configured to adjust luminance of a predetermined number of sub-views that are adjacent to the first and second target views from among a plurality of sub-views that constitute the plurality of views below a predetermined luminance value, and provide the luminance-adjusted sub-views.

19. The multi-viewpoint image display device as claimed in claim 15, wherein the controller is configured to adjust the luminance of the remaining views so that the luminance is decreased in reverse proportion to distances between the remaining views and the target views positioned in the same direction as the first target view and the second target view, and to adjust the luminance of the remaining views so that the luminance is increased in reverse proportion to distances between the remaining views positioned in the same direction as the first target view and the second target view.

20. The multi-viewpoint image display device as claimed in claim 1, wherein the first target view and the second target view and remaining views provided to the user's left-eye and right-eye respectively are positioned so as to minimize overlap between the left-eye and right eye images.

* * * * *